(12) United States Patent
Boxey

(10) Patent No.: US 6,237,938 B1
(45) Date of Patent: May 29, 2001

(54) INFLATABLE CURTAIN WITH ANCHOR DEVICE

(75) Inventor: Kevin J. Boxey, Columbianville, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/388,819

(22) Filed: Sep. 1, 1999

(51) Int. Cl.⁷ .................................................. B60R 21/16
(52) U.S. Cl. .......................................................... 280/730.2
(58) Field of Search .................. 280/730.2, 749

(56) References Cited

U.S. PATENT DOCUMENTS

| | | | |
|---|---|---|---|
| 3,687,485 | 8/1972 | Campbell . | |
| 5,265,903 | 11/1993 | Kuretake et al. | 280/730.2 |
| 5,333,898 | 8/1994 | Stutz | 280/730.2 |
| 5,462,308 | 10/1995 | Seki et al. | 280/749 |
| 5,588,672 | 12/1996 | Karlow et al. | 280/730.2 |
| 5,660,414 | 8/1997 | Karlow et al. | 280/749 |
| 5,707,075 | 1/1998 | Kraft et al. | 280/730.2 |
| 5,788,270 | 8/1998 | Haland et al. | 280/729 |
| 5,865,462 | 2/1999 | Robins et al. | 280/730.2 |
| 5,924,723 | * 7/1999 | Brantman et al. | 280/730.2 |
| 5,975,566 | * 11/1999 | Böcker et al. | 280/730.2 |

* cited by examiner

Primary Examiner—Kenneth R. Rice
(74) Attorney, Agent, or Firm—Tarolli, Sundheim, Covell, Tummino & Szabo L.L.P.

(57) ABSTRACT

An apparatus (10) for helping to protect an occupant of a vehicle (12) which has a side structure (16) and a roof (18) comprises a vehicle occupant protection device (14). The vehicle occupant protection device (14) is inflatable in a first direction away from the roof (18) into a position between the side structure (16) of the vehicle (12) and a vehicle occupant. An inflator (24) provides inflation fluid for inflating the vehicle occupant protection device (14). An element (54) is connected to a C pillar (56) of the vehicle (12) and is movable in the first direction along the C pillar. The element (54) is connected to the vehicle occupant protection device (14) and is movable with the vehicle occupant protection device in the first direction. A latch (110) blocks movement of the element (54) in a direction opposite the first direction.

31 Claims, 2 Drawing Sheets

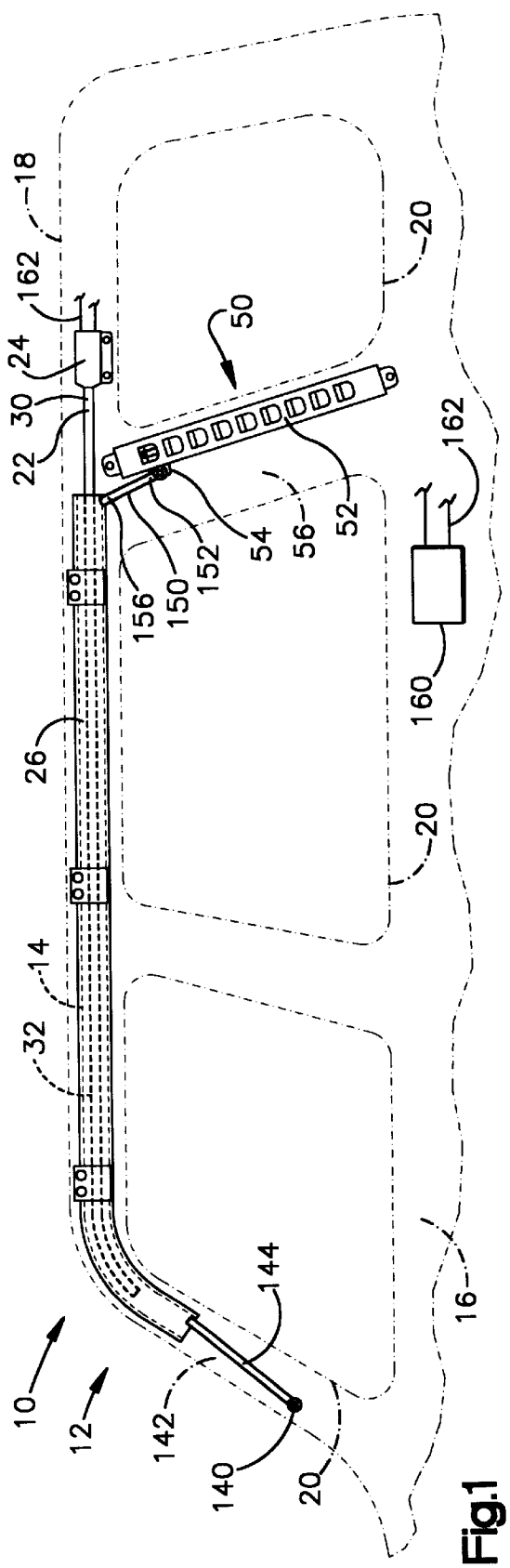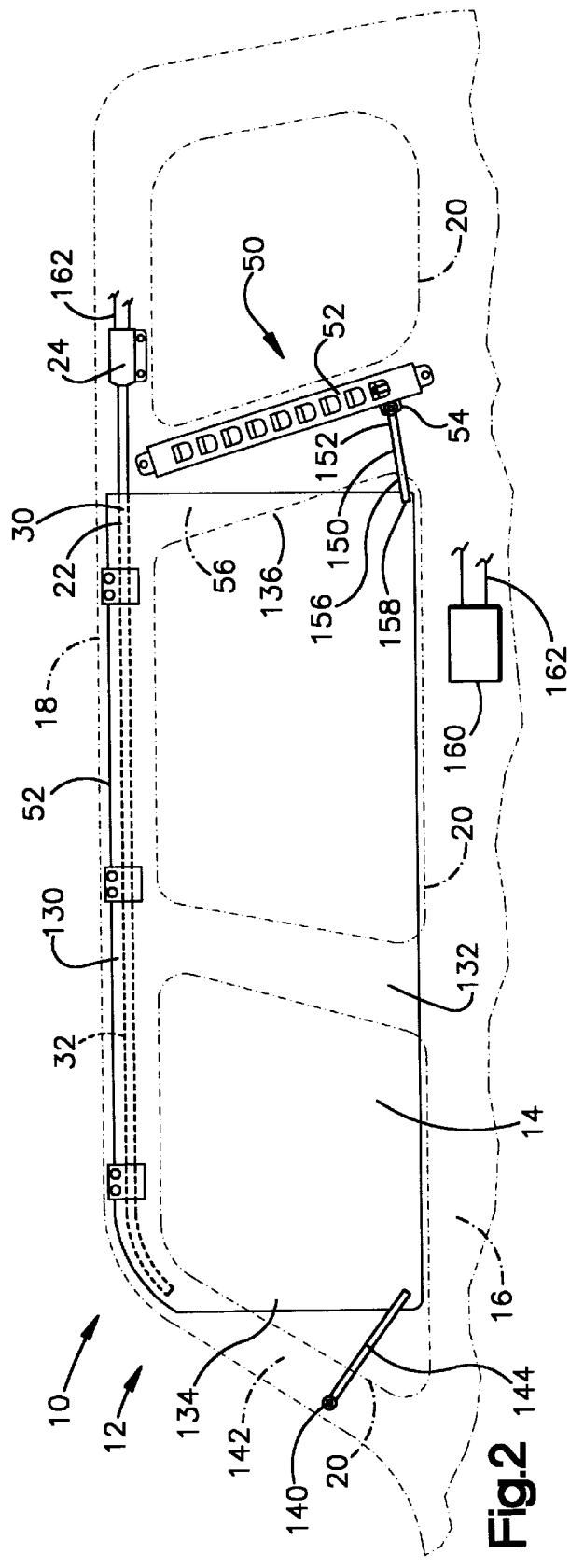

INFLATABLE CURTAIN WITH ANCHOR DEVICE

FIELD OF THE INVENTION

The present invention relates to an inflatable vehicle occupant protection device for helping to protect a vehicle occupant in the event of a side impact to a vehicle and/or a vehicle rollover.

BACKGROUND OF THE INVENTION

It is known to inflate a vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. Such an inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle which has a side structure and a roof. The apparatus includes a vehicle occupant protection device that is inflatable in a first direction into a position between the side structure of the vehicle and a vehicle occupant. An inflator provides inflation fluid for inflating the vehicle occupant protection device. An element is connected to a C pillar of the vehicle and is movable in the first direction along the C pillar. The element is connected to the vehicle occupant protection device and is movable with the vehicle occupant protection device in the first direction. A latch blocks movement of the element in a direction opposite the first direction.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of a vehicle safety apparatus in a deflated condition according to the present invention;

FIG. 2 is a schematic view of the vehicle safety apparatus of FIG. 1 in an inflated condition;

DESCRIPTION OF PREFERRED EMBODIMENTS

Figure 3:
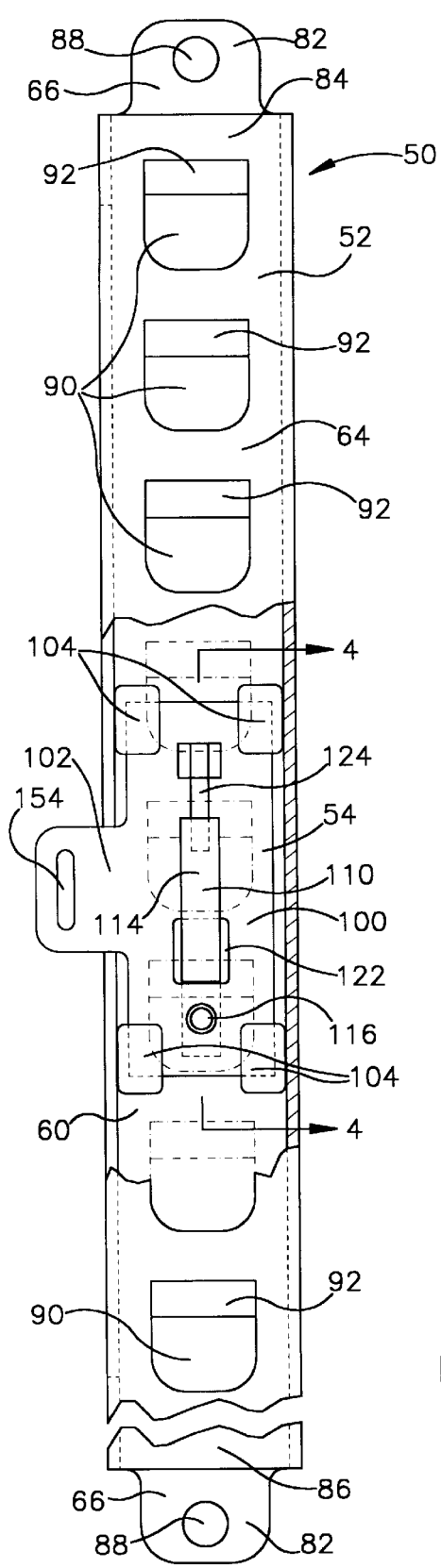
FIG. 3 is an enlarged elevational view, partly in section, of an anchoring device which forms a part of the vehicle safety apparatus of FIG. 1.

As representative of the present invention, an apparatus 10 for helping to protect an occupant of a vehicle 12 includes a vehicle occupant protection device. As shown in FIGS. 1 and 2, the vehicle occupant protection device comprises an inflatable curtain 14 mounted adjacent to the side structure 16 of the vehicle 12 and the vehicle roof 18. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 which is disposed in the inflatable curtain 14. The second end portion 32 of the fill tube 22 has a plurality of openings (not shown) that provide fluid communication between the fill tube 22 and the inflatable curtain 14.

The inflator 24 preferably contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid.

The apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 28 and along the side structure 16 of the vehicle 12 above the side windows 20.

The apparatus 10 (FIGS. 1 and 2) includes an anchoring device 50. The anchoring device 50 includes a track 52 and an element 54 which is slidable within the track 52. The track 52 is fixed to the side structure 16 of the vehicle 12 on a C pillar 56 of the vehicle 12.

Figure 4:
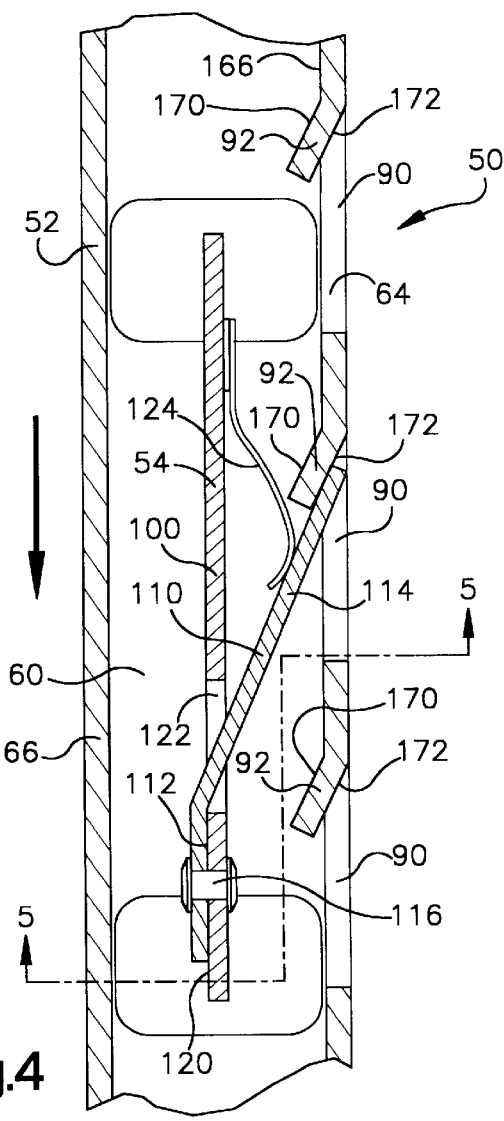
FIG. 4 is a sectional view of the anchoring device taken generally along line 4—4 in FIG. 3.
Figure 5:
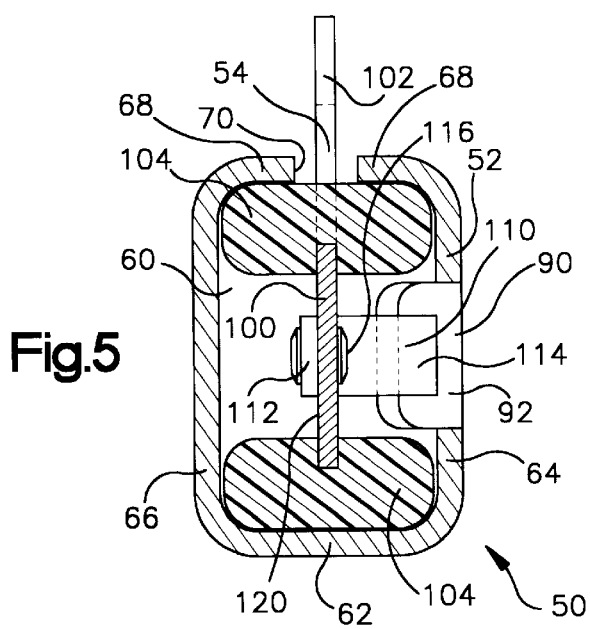
FIG. 5 is a sectional view of the anchoring device taken generally along line 5—5 in FIG. 4.

Referring now to FIGS. 3–5, the track 52 is generally elongated and tubular in construction, and forms a channel 60 which extends along the length of the track 52. The track 52 consists generally of a single elongated piece of material, such as metal, which is bent to form the tubular shape of the track 52. As best viewed in FIG. 5, the track 52 includes an end wall 62, a first side wall 64 and a second side wall 66. The first and second side walls 64 and 66 extend parallel to each other from opposite ends of the end wall 62. Turned-in portions 68 of the first and second side walls 64 and 66 meet each other to form the tubular shape of the track 52. However, the turned-in portions 68 of the first and second side walls 64 and 66 are spaced apart to form a slot 70 which extends along the length of the track 52 opposite the end wall 62.

The track 52 (FIG. 3) includes mounting flanges 82 which extend from the second side wall 66 at first and second ends 84 and 86 of the track 52. Each mounting flange 82 includes a fastener aperture 88 for receiving a fastener (not shown), such as a bolt or screw, which fastens the track 52 to the C pillar 56 of the vehicle 12. The track 52 is positioned on the C pillar 56 such that the length of the track 52 extends parallel to the C pillar 56 with its length oriented in a generally vertical direction with respect to the direction of forward travel of the vehicle 12.

The track 52 (FIGS. 3–5) also includes a series of latch apertures 90 which are spaced along the first side wall 64. The latch apertures 90 are generally rectangular in shape and extend through the first side wall 64. A portion of the first side wall 64 defining each latch aperture 90 is bent inwards and forms a latch tooth 92 which extends into the channel 60 from the side wall 64.

The element 54 includes a rectangular body portion 100, which is disposed in the channel 60, and a tongue portion 102 (FIGS. 3 and 5), which extends from the channel 60 through the slot 70. The element 54 is slidable within the channel 60 along the length of the track 52. The element 54 slides in the channel 60 on pads 104, which are fixed to the body portion 100 of the element 54. The pads 104 are constructed of a material, such as plastic, that provides a low frictional engagement with the channel 60. This helps the element 54 to slide within the channel 60. The pads 80 also help to position the element 54 within the channel 60, as best viewed in FIG. 5, such that the body portion 100 is centered between the first and second side walls 64 and 66 and the tongue portion 102 is aligned with the slot 70. It will be recognized by those skilled in the art, however, that alternative means such as rollers or bearings may be used to facilitate the sliding movement of the element within the channel 60.

The element 54 includes a latch 110 (FIGS. 3–5) which is connected to the body portion 100 of the element 54. As best viewed in FIG. 4, the latch 110 includes a base 112 and a latch member 114. The base 112 is positioned in an overlying relationship with the body portion 100 of the element 54 and is fixed to the element 54 by a fastener 116, such as a rivet. In the illustrated embodiment, the base 112 is fixed to a surface 120 of the body portion 100 of the element 54 opposite the latch apertures 90. The latch member 114 extends from the base 112 through an aperture 122 in the body portion 100 towards the first side wall 64. It will be recognized by those skilled in the art, however, that alternative designs may be incorporated into the construction of the latch 110. For example, the latch member 114 may be pivotally connected to the body portion 100 of the element 54 by a hinge.

The fastener 116 forms a generally loose fit between the latch 110 and the body portion 100 of the element 54. This allows the latch 110 to move pivotally within the channel 60 in a direction towards the first side wall 64 or second side wall 66. The element 54 further includes a spring 124 which biases the latch member 114 towards the first side wall 64.

As illustrated in FIG. 2, the inflatable curtain 14 has a top edge 130 positioned adjacent to the vehicle roof 18 and an opposite bottom edge 132. The inflatable curtain also includes a front edge 134 and an opposite rear edge 136. In the illustrated embodiment, the front edge 124 of the inflatable curtain 14 is connected to the side structure 16 of the vehicle 12 at a location designated 140 (FIGS. 1 and 2) located on or near an A pillar 142 of the vehicle 12 by a tether 144.

The element 54 is connected to the inflatable curtain 14 by a tether 150. The tether 150 has a first end 152 connected to a slot 154 (FIG. 3) in the tongue portion 102 of the element 54 and an opposite second end 156 (FIG. 2) connected to the inflatable curtain 14 at a location designated 158 adjacent to or near the intersection of the bottom edge 132 and the rear edge 136. It will be recognized by those skilled in the art, however, that the tether 150 may be connected to the inflatable curtain 14 at locations other than location 158. Also, the tether 150 may be omitted altogether, in which case the inflatable curtain 14 would be connected directly to the tongue portion 102 of the element 54.

The vehicle 12 includes a sensor mechanism 160 (shown schematically in FIGS. 1 and 2) for sensing a side impact to the vehicle 12 and/or a rollover of the vehicle 12. The sensor mechanism 160 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 160 provides an electrical signal over lead wires 162 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 (FIG. 2) inflates under the pressure of the inflation fluid from the inflator 24. The housing 26 opens and the inflatable curtain 14 inflates in a first direction away from the vehicle roof 18, downward as shown in the drawings and in a downward direction with respect to the direction of forward travel of the vehicle 12. The curtain 14, when inflated, extends along the side structure 16 of the vehicle 12 and is positioned between the side structure 16 and any occupant of the vehicle 12.

As the inflatable curtain 14 inflates, the curtain 14 pulls on the element 54 in the first direction via the tether 150. The inflating curtain 14 causes the element 54 to slide in the first direction along the track 52, from the first end 84 towards the second end 86, and along the C pillar 56 (FIG. 2) of the vehicle 12. The first direction is indicated generally by the arrow in FIG. 4.

As the element 54 slides along the track 52 in the first direction, the latch member 114 slides along an inner surface 166 of the first side wall 64. The latch member 114 is biased against the inner surface 166 by the spring 124. When the latch member 114 reaches a latch tooth 92, the member 114 slides along an inner surface 170 of the tooth 92 and is urged inward toward the element 54, against the bias of the spring 124. When the latch member 114 moves past the latch tooth 92, the spring 124 moves the latch member 114 into the latch aperture 90 adjacent to which the one tooth 92 extends.

When the latch member 114 extends into a latch aperture 90, the latch 110 allows the element 54 to move farther in the first direction and blocks movement of the element 54 in a direction opposite the first direction. If the element moves farther in the first direction, the latch member 114 engages and slides along the inner surface 166 of the first side wall 64 towards the next latch aperture 90, as described above. If the element 54 moves in a direction opposite the first direction, the latch member 114 engages an outer surface 172 of the latch tooth 92 and is urged outward through the latch aperture 90. The fastener 116 limits the outward pivotal movement of the latch member 114 and, thus, the latch 110 blocks movement of the element 54 in the direction opposite the first direction.

As a feature of the present invention, the latch apertures 90 provide various positions along the length of the track 52 where the element 54 is blocked from moving in a direction opposite the first direction. Thus, as the element 54 slides downward in the first direction along the track 52, it is blocked from moving in the direction opposite the first direction at the farthest position from the first end 84 of the track 52 which the element 54 reaches. This feature is a benefit, for example, in a side impact or rollover event where the track 52 is deformed by impact forces such that the element 54 is prevented from moving in the first direction along the entire length of the track 52. In this instance, the element 52 would be blocked against movement in a direction opposite the first direction at the position along the track 52 where movement in the first direction is prevented.

In the inflated condition, the anchoring device 50 helps maintain the position of the curtain 14 between any occupant of the vehicle 12 and the side structure 16 of the vehicle 12 throughout the duration of the vehicle collision and/or rollover. The anchoring device 50 also helps to limit movement of the inflatable curtain 14 in a direction opposite the first direction.

From the above description of the invention, those skilled in the art will perceive improvements, changes and modifications. For example, the latch teeth 92 could be made longer and resiliently deflectable, and the latch 110 could be eliminated from the element 54. The latch teeth 92 would then contact and be deflected by the body portion 100 of the element 54. When each latch tooth 92 is registered with the aperture 122 in the body portion 100, however, the tooth would be resiliently biased into the aperture to prevent movement of the element 54 in the upward direction as viewed in FIG. 4. Continued downward movement of the element 54 would deflect the tooth 92 out of the aperture 122 so that the next tooth could engage the aperture. Each tooth 92 would thus act as a latch. Such improvements, changes and modifications within the skill of the art are intended to be covered by the appended claims.

Having described the invention, the following is claimed:

1. Apparatus for helping to protect an occupant of a vehicle which has a roof and a side structure including front and rear vehicle side windows, said apparatus comprising:

a vehicle occupant protection device which is inflatable in a first direction away from the vehicle roof into a position between the side structure of the vehicle and a vehicle occupant to cover the front and rear vehicle side windows;

an inflator for providing inflation fluid for inflating said vehicle occupant protection device;

an element which is connected to a C pillar of the vehicle adjacent the rear vehicle side window and movable in said first direction along said C pillar, said element being connected to said vehicle occupant protection device and movable with said vehicle occupant protection device in said first direction; and a latch for blocking movement of said element in a direction opposite said first direction.

2. Apparatus as defined in claim 1, wherein said vehicle occupant protection device is an inflatable curtain having a stored position extending along the side structure adjacent the roof of the vehicle, said inflatable curtain being inflated in said first direction away from the vehicle roof and along the side structure of the vehicle.

3. Apparatus as defined in claim 2, further including a fill tube having a portion located in said inflatable curtain, said inflator being in fluid communication with said fill tube, said inflator, when actuated, providing inflation fluid to said fill tube, said fill tube directing said inflation fluid into said inflatable curtain to inflate said inflatable curtain.

4. Apparatus as defined in claim 2, wherein said inflatable curtain moves said element in said first direction as said inflatable curtain is inflated.

5. Apparatus as defined in claim 2, wherein said element helps to maintain the position of said inflatable curtain when said inflatable curtain is inflated.

6. Apparatus as defined in claim 2, wherein said inflatable curtain when inflated has a top edge positioned adjacent to the vehicle roof and an opposite bottom edge, said element being connected to said inflatable curtain at a position adjacent to said bottom edge.

7. Apparatus as defined in claim 2, wherein a tether connects said element to said inflatable curtain.

8. Apparatus as defined in claim 2, further including a sensor for sensing a predetermined vehicle condition and providing a signal in response to said predetermined vehicle condition which causes said inflator to provide said inflation fluid to inflate said inflatable curtain.

9. Apparatus as defined in claim 8, wherein said predetermined vehicle condition is one of a side impact and a vehicle rollover.

10. Apparatus as defined in claim 1, further comprising a track which is fixed to the C pillar of the vehicle, said element being connected to said track and slidable relative to said track in said first direction.

11. Apparatus for helping to protect an occupant of a vehicle which has a roof and a side structure, said apparatus comprising:

a vehicle occupant protection device which is inflatable in a first direction away from the vehicle roof into a position between the side structure of the vehicle and a vehicle occupant;

an inflator for providing inflation fluid for inflating said vehicle occupant protection device;

an element which is connected to a C pillar of the vehicle and movable in said first direction along said C pillar, said element being connected to said vehicle occupant protection device and movable with said vehicle occupant protection device in said first direction;

a latch for blocking movement of said element in a direction opposite said first direction, a track fixed to the C pillar of the vehicle, said element being connected to said track and slidable relative to said track in said first direction, said latch being engagable with apertures spaced along the length of said track to resist movement of said element in a direction opposite the first direction at various positions spaced along the length of said track.

12. Apparatus for helping to protect an occupant of a vehicle which has a roof and a side structure, said apparatus comprising:

a vehicle occupant protection device which is inflatable in a first direction away from the vehicle roof into a position between the side structure of the vehicle and a vehicle occupant;

an inflator for providing inflation fluid for inflating said vehicle occupant protection device;

a track connected to the vehicle, said track defining a series of blocking positions which are spaced along the length of said track;

an element that is connected to said track and slidable along said track, said element being connected to said vehicle occupant protection device and movable with said vehicle occupant protection device in said first direction; and at least one latch which is effective to block movement of said element in a direction opposite said first direction, said movement of said element in a direction opposite said first direction being blocked at each of said blocking positions spaced along the length of said track.

13. Apparatus as defined in claim 12, wherein said track is connected to a C pillar of the vehicle.

14. Apparatus as defined in claim 13, wherein said vehicle occupant protection device is an inflatable curtain having a stored position extending along the side structure adjacent the roof of the vehicle, said inflatable curtain being inflated in said first direction away from the vehicle roof and along the side structure of the vehicle.

15. Apparatus as defined in claim 14, further including a fill tube having a portion located in said inflatable curtain, said inflator being in fluid communication with said fill tube, said inflator, when actuated, providing inflation fluid to said fill tube, said fill tube directing said inflation fluid into said inflatable curtain to inflate said inflatable curtain.

16. Apparatus as defined in claim 14, wherein said inflatable curtain moves said element in said first direction as said inflatable curtain is inflated.

17. Apparatus as defined in claim 14, wherein said element helps to maintain the position of said inflatable curtain when said inflatable curtain is inflated.

18. Apparatus as defined in claim 14, wherein said inflatable curtain when inflated has a top edge positioned adjacent to the vehicle roof and an opposite bottom edge, said element being connected to said inflatable curtain at a position adjacent to said bottom edge.

19. Apparatus as defined in claim 14, wherein a tether connects said element to said inflatable curtain.

20. Apparatus as defined in claim 14, further including a sensor for sensing a predetermined vehicle condition and providing a signal in response to said predetermined vehicle condition which causes said inflator to provide said inflation fluid to inflate said inflatable curtain.

21. Apparatus as defined in claim 20, wherein said predetermined vehicle condition is one of a side impact and a vehicle rollover.

22. Apparatus for helping to protect an occupant of a vehicle which has a roof and a side structure, said apparatus comprising:

a vehicle occupant protection device which is inflatable in a first direction away from the vehicle roof into a position between the side structure of the vehicle and a vehicle occupant;

an inflator for providing inflation fluid for inflating said vehicle occupant protection device;

an element which is connected to the vehicle and movable in said first direction along the vehicle, said element being connected to said vehicle occupant protection device and movable with said vehicle occupant protection device in said first direction;

a latch for blocking movement of said element in a direction opposite said first direction; and a structure engagable with said latch to resist movement of said element in a direction opposite said first direction at various positions of said element.

23. Apparatus as defined in claim 22, wherein said anchoring device is fixed to the vehicle and includes a track, said element being connected to said track and slidable relative to said track in said first direction.

24. Apparatus as defined in claim 22, wherein said vehicle occupant protection device is an inflatable curtain having a stored position extending along the side structure adjacent the roof of the vehicle, said inflatable curtain being inflated in said first direction away from the vehicle roof and along the side structure of the vehicle.

25. Apparatus as defined in claim 24, further including a fill tube having a portion located in said inflatable curtain, said inflator being in fluid communication with said fill tube, said inflator, when actuated, providing inflation fluid to said fill tube, said fill tube directing said inflation fluid into said inflatable curtain to inflate said inflatable curtain.

26. Apparatus as defined in claim 24, wherein said inflatable curtain moves said element in said first direction as said inflatable curtain is inflated.

27. Apparatus as defined in claim 24, wherein said element helps to maintain the position of said inflatable curtain when said inflatable curtain is inflated.

28. Apparatus as defined in claim 24, wherein said inflatable curtain when inflated has a top edge positioned adjacent to the vehicle roof and an opposite bottom edge, said element being connected to said inflatable curtain at a position adjacent to said bottom edge.

29. Apparatus as defined in claim 24, wherein a tether connects said element to said inflatable curtain.

30. Apparatus as defined in claim 24, further including a sensor for sensing a predetermined vehicle condition and providing a signal in response to said predetermined vehicle condition which causes said inflator to provide said inflation fluid to inflate said inflatable curtain.

31. Apparatus as defined in claim 30, wherein said predetermined vehicle condition is one of a side impact and a vehicle rollover.

* * * * *